United States Patent
Sartori et al.

(10) Patent No.: US 8,923,363 B2
(45) Date of Patent: Dec. 30, 2014

(54) SYSTEM AND METHOD FOR COMMUNICATING REFERENCE SIGNALS

(75) Inventors: Philippe Sartori, Algonquin, IL (US); Zhongfeng Li, Shanghai (CN); Anthony C. K. Soong, Plano, TX (US); Yiqun Qian, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 210 days.

(21) Appl. No.: 13/544,150

(22) Filed: Jul. 9, 2012

(65) Prior Publication Data

US 2013/0010836 A1    Jan. 10, 2013

Related U.S. Application Data

(60) Provisional application No. 61/505,922, filed on Jul. 8, 2011.

(51) Int. Cl.
*H04L 1/00* (2006.01)
*H04L 5/00* (2006.01)
*H04L 25/02* (2006.01)

(52) U.S. Cl.
CPC .......... *H04L 5/0016* (2013.01); *H04L 5/0051* (2013.01); *H04L 25/0226* (2013.01)
USPC ........... 375/146; 375/260; 375/262; 375/265; 375/267; 375/299

(58) Field of Classification Search
CPC ... H04L 1/1819; H04L 1/0057; H04L 1/0061; H04L 1/1867; H04L 1/244; H04L 5/0007; H04L 5/0048; H04L 1/0625; H04L 1/0688; H04L 2027/0095; H04L 5/0016; H04B 7/2656; H04J 13/0029; H04J 13/0048
USPC .......... 375/146, 260, 262, 267, 299; 370/203, 370/208, 329, 335
See application file for complete search history.

(56) References Cited

U.S. PATENT DOCUMENTS

| | | | |
|---|---|---|---|
| 7,145,862 B2 | 12/2006 | Batariere et al. | |
| 8,446,886 B2 * | 5/2013 | Hu et al. | 370/335 |
| 8,576,822 B2 * | 11/2013 | Yoon et al. | 370/342 |
| 2005/0175115 A1 | 8/2005 | Walton et al. | |
| 2008/0240269 A1 | 10/2008 | Pajukoski et al. | |
| 2010/0111018 A1 | 5/2010 | Chang | |
| 2010/0135273 A1 | 6/2010 | Kim | |

OTHER PUBLICATIONS

Huawei, Hisilicon, "MIMO enhancements for downlink relay backhaul," 3GPP TSG RAN WG1 meeting #65, R1-111391, Barcelona, Spain, May 9-13, 2011, 2 pages.

(Continued)

*Primary Examiner* — Dhaval Patel
(74) *Attorney, Agent, or Firm* — Slater & Matsil, L.L.P.

(57) ABSTRACT

A method for communicating DM-RS symbols to support MIMO transmissions having five or more layers of spatial multiplexing. A first subframe is communicated carrying two leading symbols of a first length-4 OCC sequence and two leading symbols of a second length-4 OCC sequence, and a second subframe is communicated carrying two trailing symbols of the first length-4 OCC and two trailing symbols of the second length-4 OCC sequence. Optionally four length-2 OCCs can be carried in a similar manner or, alternatively, in different frequency bands or resource block pairs of a common subframe.

27 Claims, 9 Drawing Sheets

(56) References Cited

OTHER PUBLICATIONS

3rd Generation Partnership Project; Technical Specification Group Radio Access Network; Evolved Universal Terrestrial Radio Access (E-UTRA); Physical layer for relaying operation (Release 10), 3GPP TS 36.216 v10.3.1 Technical Specification, Sep. 2011, 16 pages.

3rd Generation Partnership Project; Technical Specification Group Radio Access Network; Evolved Universal Terrestrial Radio Access (E-UTRA); Physical Channels and Modulation (Release 10), 3GPP TS 36.211 v10.4.0 Technical Specification, Dec. 2011, 101 pages.

LTE, "3rd Generation Partnership Project; Technical Specification Group Radio Access Network; Evolved Universal Terrestrial Radio Access (E-UTRA); Physical Layer for Relaying Operation (Release 10)," 3GPP TS 36.216 v.10.2.0, Mar. 2011, 16 pages.

Guey, J., et al., "Adaptive Pilot Allocation in Downlink OFDM," in Proc. of Wireless Communications and Networking Conference (WCNC 2008), Las Vegas, USA, Apr. 2008, pp. 840-845.

International Search Report received in Application No. PCT/US2012/045955, mailed Sep. 28, 2012, 2 pages.

Simeone, O., et al. "Adaptive Pilot Pattern for OFDM Systems," 2004 IEEE International Conference on Communications, vol. 2, Jun. 20-24, 2004, pp. 978-982.

LTE "Evolved Universal Terrestrial Radio Access (E-UTRA); Physical Channels and Modulation (3GPP TS 36.211 version 10.2.0 Release 10)," ETSI TS 136 211 v10.2.0, Jun. 2011, 105 pages.

* cited by examiner

SYSTEM AND METHOD FOR COMMUNICATING REFERENCE SIGNALS

This application claims the benefit of U.S. Provisional Application No. 61/505,922, filed by Sartori et al. on Jul. 8, 2011, entitled "UE Specific RS Configurations for a Relay Backhaul Link," which is incorporated by reference herein as if reproduced in its entirety.

TECHNICAL FIELD

The present invention relates generally to digital communications, and more particularly to a system and method for signaling reference signals, or measuring channel state information using reference signals in a communications system.

BACKGROUND

Modern wireless systems often use multiple-input and multiple-output (MIMO) transmission techniques to achieve higher data rates. MIMO transmission generally refers to the utilization of multiple antennas at the transmitter and/or receiver, and includes a variety of diverse techniques including spatial multiplexing, diversity coding, pre-coding, etc. In particular, using spatial multiplexing by sending multiple spatial streams for a single user is quite useful in high-interference networks because it splits a relatively high data-rate signal into multiple lower data-rate streams, which helps lower the bit-error-rate (BER) of the communication channel. Notably, each of the lower data-rate streams is transmitted by a different transmission antenna port in a common frequency channel, with each individual stream being recognized upon reception by its unique spatial signature (e.g., transmit and/or receive weights). Hence, spatial multiplexing essentially enables the transmitter to communicate parallel streams (e.g., spatial multiplexed layers) of information over the same frequency band.

The maximum number of spatial multiplexing streams/layers ($N_s$) is limited by the lesser of the number of antennas at the transmitter ($N_t$) or the number of antennas at the receiver ($N_r$), e.g., $N_s=\min(N_t, N_r)$. Generally speaking, additional layers of spatial multiplexing increase spectral efficiency in the channel, thereby allowing for greater throughput, simultaneously supporting more transmitting users, etc. For instance, a network supporting eight layers of spatial multiplexing (e.g., $N_s=8$) may generally outperform a network supporting only four layers of spatial multiplexing (e.g., $N_s=4$). As such, modern communications standards are trending towards the utilization of more and more layers of spatial multiplexing (i.e., the use of more antenna ports). For instance, 3rd Generation Partnership Project (3GPP) long term evolution (LTE) release 10 (rel-10) specifies supporting up to eight layers of spatial multiplexing (e.g., 8 antennas at the transmitter and receiver).

To utilize spatial multiplexing effectively, the transmitter must generally have some knowledge of the communications channel, which (in the context of LTE) is generally referred to as channel state information (CSI). Specifically, CSI is obtained when a user equipment (UE) or relay node (RN) performs channel estimation on a reference signal that is propagated through the downlink channel, e.g., the physical downlink shared channel (PDSCH) or physical downlink control channel (PDCCH). The CSI may then be feedback to the base station directly (e.g., via an uplink control channel), or indirectly (e.g., by sending an indicator related to the CSI using channel reciprocity for a Time Division Duplexing (TDD)). In 3GPP LTE rel-10, the reference signal may be a dedicated/de-modulation reference signal (DM-RS) capable of supporting up to eight layers.

SUMMARY

Example embodiments provide a system and method for carrying DM-RS symbols in a communications system.

In an embodiment, a method of communicating reference signal symbols is provided. In this example, the method includes communicating, in a channel, a first subframe carrying a first set of symbols of a first spreading code sequence and a first set of symbols of a second spreading code sequence. The method further includes communicating, in the channel, a second subframe in a channel carrying a second set of symbols of the first spreading code and a second set of symbols of the second spreading code sequence.

In another embodiment, a method of communicating reference signal symbols is provided. In this example, the method includes communicating a first subframe carrying a first and second symbol of a first length-4 OCC sequence and a first and second symbol of a second length-4 OCC sequence. The method further includes communicating a second subframe carrying a third and fourth symbol of the first length-4 OCC and a third and fourth symbol of the second length-4 OCC sequence. In this embodiment, channel estimation is performed on all four symbols of the first length-4 OCC sequence and all four symbols of the second length-4 OCC sequence to support MIMO transmissions in a downlink channel.

In yet another embodiment, a method of communicating reference signal symbols is provided. In this example, the method includes communicating a first subframe carrying a first length-2 OCC sequence and a second length-2 OCC sequence. The method further includes communicating a second subframe carrying a third length-2 OCC sequence and fourth length-2 OCC sequence. In this embodiment, channel estimation is performed on all four length-2 OCC sequences to support MIMO transmissions having five or more layers of spatial multiplexing in the downlink channel.

In yet another embodiment, a method of communicating reference signal symbols is provided. In this example, the method includes communicating a first subframe comprising a first resource block pair (RBP) that carries a first length-2 OCC sequence and a second length-2 OCC sequence both of which correspond to a first set of four antenna ports. The first subframe further comprises a second RBP carrying a third length-2 OCC sequence and a fourth length-2 OCC sequence both of which correspond to a second set of four antenna ports that is different from the first set of antenna ports. In this example, channel estimation is performed on the first length-2 OCC sequence, the second length-2 OCC sequence, the third length-2 OCC sequence, and the fourth length-2 OCC sequence to support MIMO transmissions having five or more layers of spatial multiplexing in the downlink channel.

Other embodiments of this disclosure include apparatuses/devices for executing and/or facilitating the execution of one or multiple steps of the methods summarized above.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The operating of the current example embodiments and the structure thereof are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

Although aspects of this disclosure are discussed in the context of LTE, they may generally be applied to other standards compliant communications systems, such as Institute of Electrical and Electronics Engineers (IEEE) 802.16, WiMAX, 3GPP2 systems, and the like.

One challenge in 3GPP LTE rel-10 is that the downlink subframe may be incapable of carrying enough DM-RS symbols to support five or more layers of spatial multiplexing when channel conditions are less than ideal (e.g., when poor synchronization prevents transmitting one or more timeslots of the subframe). Such may occur when attempting to transmit data on the backhaul link of a relay node. As such, techniques for transporting sufficient amounts of DM-RS signals during non-ideal channel conditions (e.g., sub-optimal synchronization) are desired so that five or more layers of spatial multiplexing (e.g., eight layers) may be reliably supported.

Figure 1:
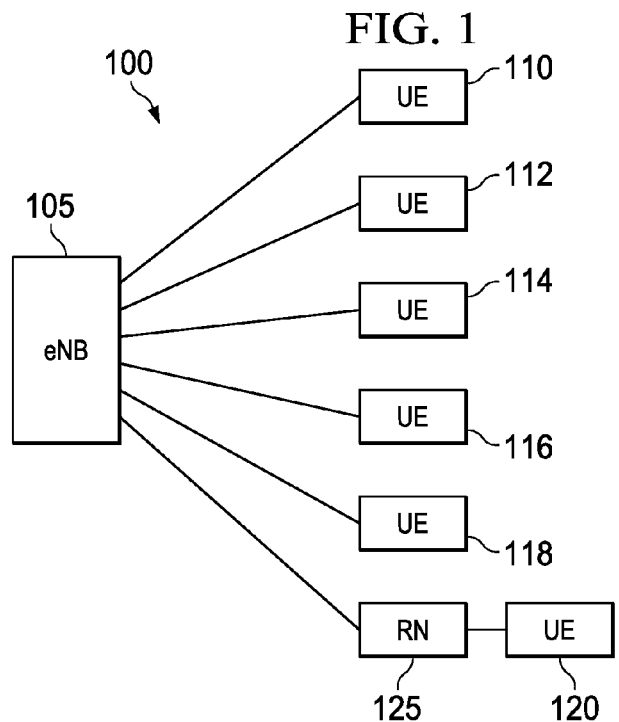
FIG. 1 illustrates a diagram of a wireless communications network.

FIG. 1 illustrates a diagram of a wireless communications network 100 for supporting communications that utilize eight-layer spatial multiplexing MIMO transmission techniques. The wireless communications network 100 may include an evolved NodeB (eNB) 105, a plurality of user equipments (UEs) 110-120, and a relay node (RN) 125. The eNB 105 may be any component or collection of components that is capable of communicating with the one or more of the UEs 110-120 and/or RN 125, and may be elsewhere referred to as a controller, a communications controller, a base station, a NodeB, etc. The eNB 105 may communicate with the UEs 110-120, the RN 125, and/or other nodes/devices (e.g., including those not explicitly depicted in FIG. 1), via one or more downlink channels (e.g., PDSCH, PDCCH, etc.), as well as one or more uplink channels (e.g., an uplink shared channel (UL-SCH), etc.). The UEs 110-120 may be any component or collection of components that allow a user to access the wireless communications network 100, and may be elsewhere referred to as mobiles, mobile stations, subscribers, users, terminals, wireless nodes, etc. The RN 125 may be any component or collection of components that facilitates a user's access to the wireless communications network 100 by extending the range of an uplink or downlink transmission. For instance, the RN 125 may serve as an intermediary between the UE 120 and the eNB 105, thereby relaying communications back and forth between the two parties.

Figure 2:
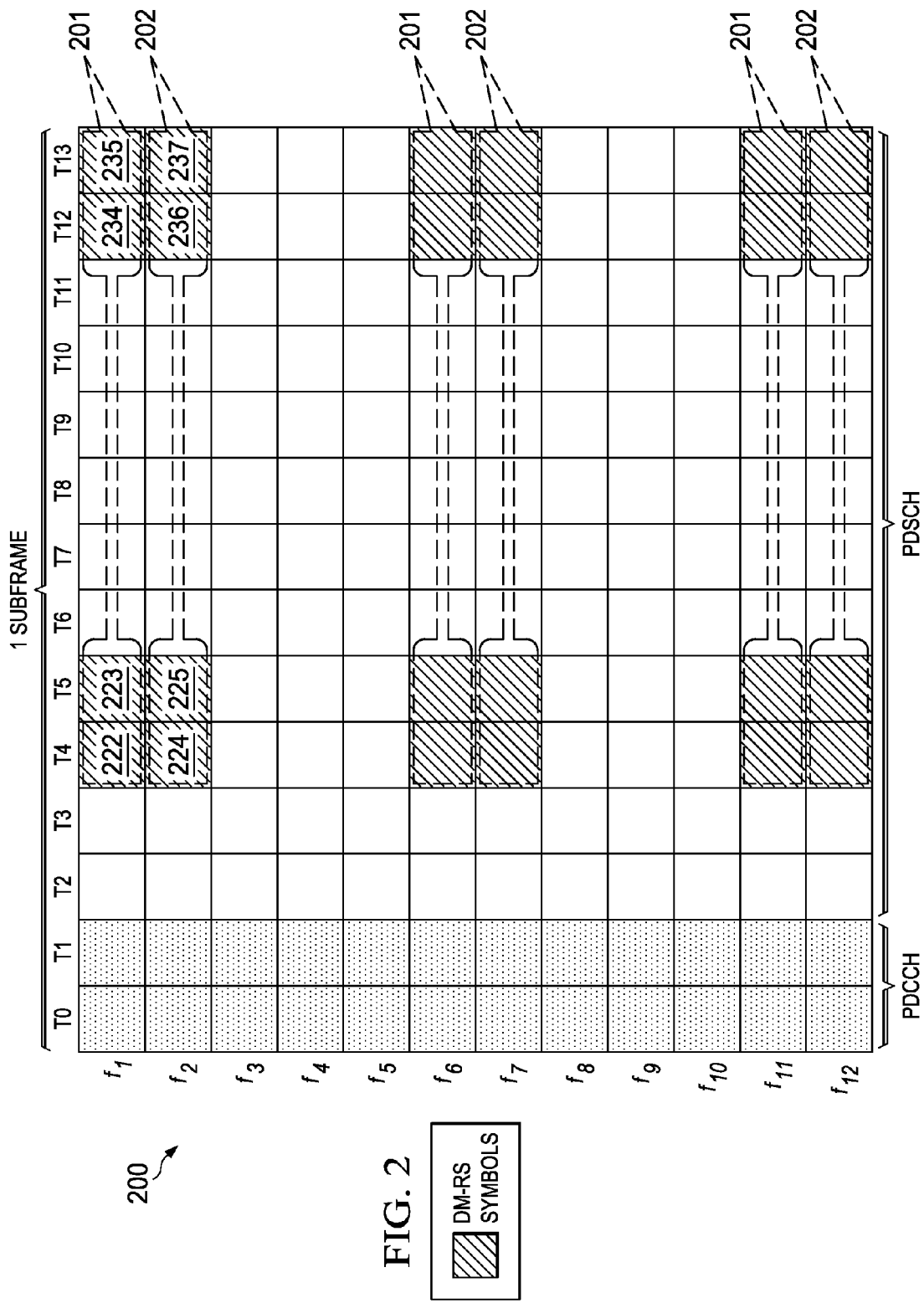
FIG. 2 illustrates a diagram of a prior-art subframe for carrying DM-RS symbols.

FIG. 2 illustrates a diagram of a normal subframe 200 carrying a standard DM-RS. As shown, the subframe 200 carries two length-4 orthogonal cover codes (OCCs) 201-202 in resource elements (REs) 222-245, which are positioned in the T5, T6, T12, and T13 timeslots of the subframe 200. The DM-RS symbols carried in the two length-4 OCCs 201-202 may be used for performing channel estimation in the PDSCH, and may support five or more layers of spatial multiplexing (e.g., up to eight layers of spatial multiplexing). A first instance of the length-4 OCC 201 may span four REs 222-223 and 234-235 positioned in a first subcarrier ($f_1$) of the subframe 200, while a first instance of the length-4 OCC 202 may span four REs 224-225 and 236-237 position in a second subcarrier ($f_2$) of the subframe 200. A second and third instance of the length-4 OCC 201 may be repeated in a sixth subcarrier ($f_6$) and an eleventh subcarrier ($f_{11}$), respectively, of the subframe 200, while a second and third instance of the length-4 OCC 202 may be repeated in a seventh subcarrier ($f_7$) and an twelfth subcarrier ($f_{12}$), respectively, of the subframe 200. The second and third instances of the length-4 OCCs 201-202 allow for accurate estimation of the channel (e.g., over various sub-channels).

Figure 3:
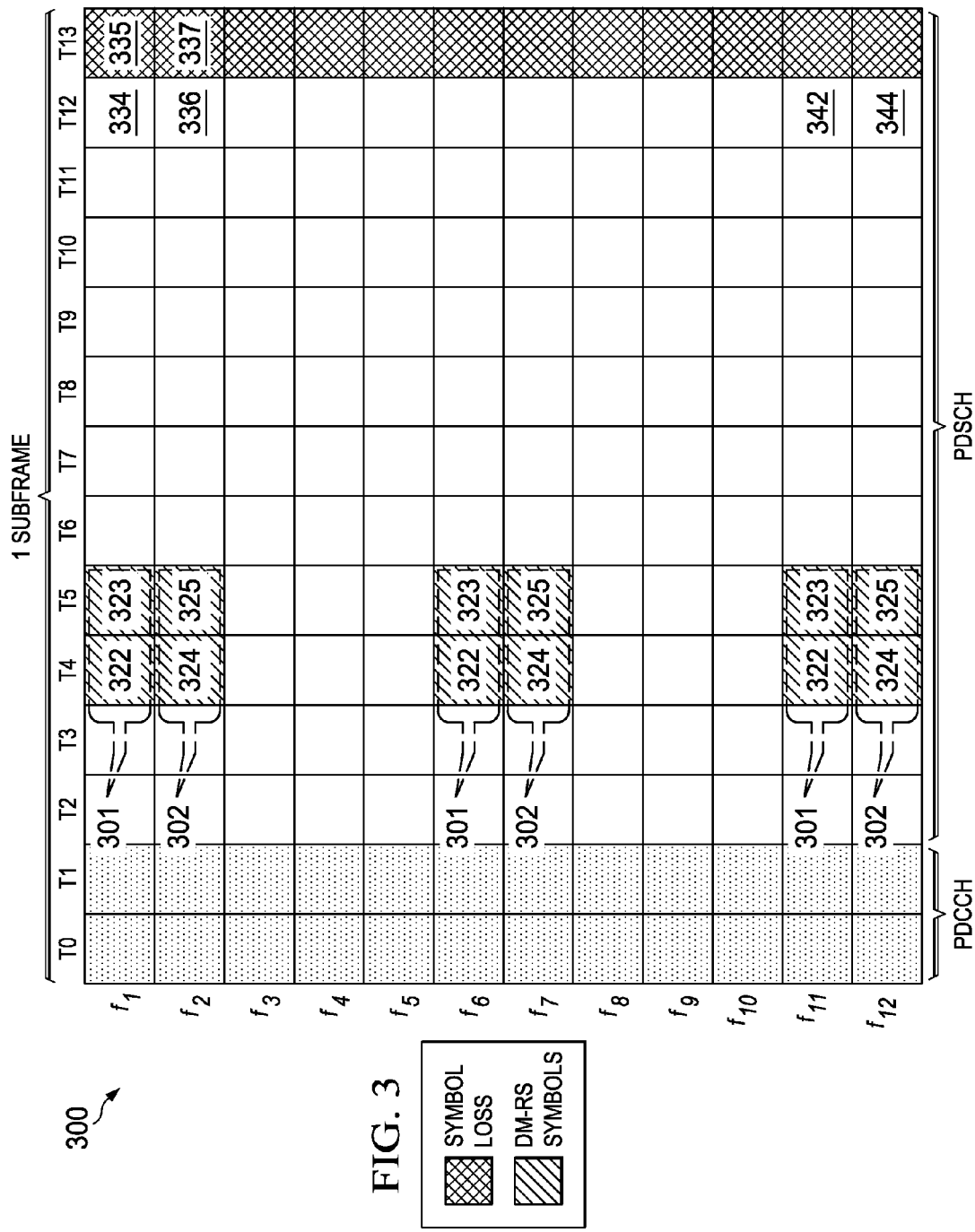
FIG. 3 illustrates a diagram of another prior-art subframe for carrying DM-RS symbols.

In some situations, channel conditions and/or synchronization problems may prevent the effective transmission of the last timeslot (e.g., the T13 timeslot) of a subframe. FIG. 3 illustrates a diagram of a subframe 300 carrying a standard DM-RS pattern in non-ideal channel conditions. As shown, the 13 T timeslot of the subframe 300 is not transmitted, and consequently is incapable of carrying the last DM-RS symbol. Further, the T12 timeslot is prevented from carrying DM-RS by virtue of the symbol loss in the T13 timeslot because DM-RS symbols are carried in pairs of consecutive REs. Hence, the REs 334-337 remain empty, thereby preventing the subframe 300 from carrying a length-4 OCC. Instead, the subframe 300 is restricted to carrying two length-2 OCCs 301 and 302, a first instance of which is carried in the REs 322-323 and 324-325 (respectively), and a second and third instance of which are carried in the $f_6$-$f_7$ and $f_{11}$-$f_{12}$ subcarriers. The length-2 OCCs 301-302 are capable of supporting two antenna ports apiece, and hence the subframe 300 can support a maximum of four layers of spatial multiplexing (e.g., 5, 6, 7, or 8 antenna ports). Accordingly, techniques for supporting more than four layers of spatial multiplexing during non-ideal channel conditions are desired.

Figure 4:
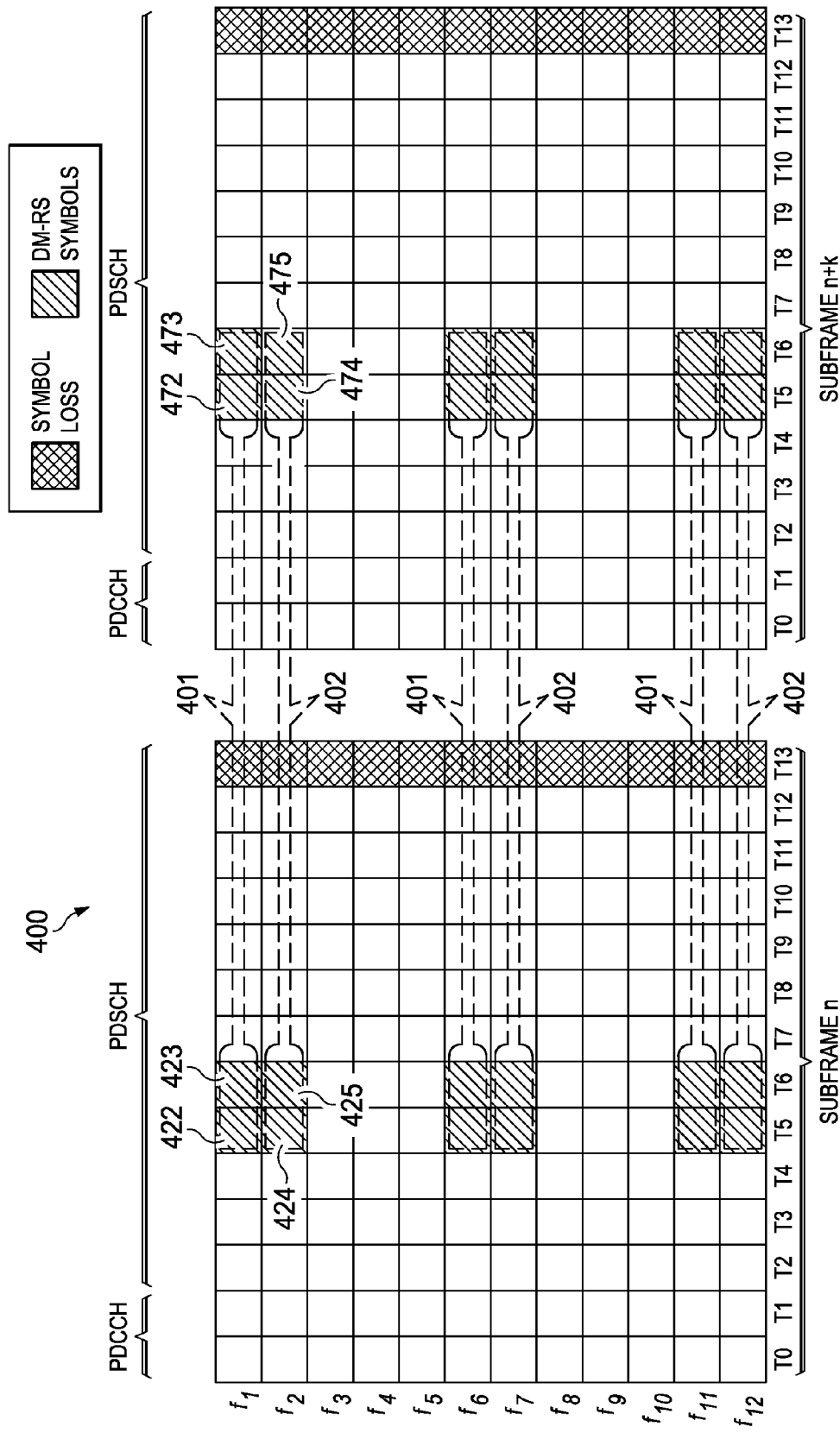
FIG. 4 illustrates a diagram of an embodiment of a transmission sequence for carrying DMRS symbols in two length-4 orthogonal cover codes (OCCs)

One solution to supporting eight layers of spatial multiplexing during non-ideal channel conditions is to carry two length-4 OCCs using two subframes. FIG. 4 illustrates a transmission sequence 400 for carrying two length-4 OCCs 401-402 over a pair of subframes. As shown, the first two symbols of each of the length-4 OCCs 401-402 are carried in a first subframe (e.g., subframe n), while the second two symbols of each of the length-4 OCCs 401-402 are carried in a subsequent subframe (e.g., subframe n+k). Specifically, the subframe n carries the first two symbols of the length-4 OCC 401 in the REs 422-423 and the first two symbols of the length-4 OCC 402 in the REs 424-425. The subframe n+k carries the third and fourth symbols of the length-4 OCC 401 in the REs 472-473 and the third and fourth symbols of the length-4 OCC 402 in the REs 474-475. Second and third instances of the length-4 OCCs 401-402 are carried in the $f_6$-$f_7$ and $f_{11}$/$f_{12}$ subcarriers of the subframe n and the subframe n+k. Accordingly, the transmission sequence 400 supports up to eight layers of spatial multiplexing even when the T13 timeslot of one (or both) of the subframe n and the subframe n+k are unavailable for carrying DM-RS symbols. Table 1 below shows possible bit sequences for identifying antenna ports in the transmission sequence 400. The symbol "Ø" indicates that no signal is transmitted.

TABLE 1

| | | | | Antenna port p | | | | |
|---|---|---|---|---|---|---|---|---|
| | Subframe n | | | | Subframe n + k | | | |
| TS | [T4 | T5 | T12 | T13] | =[T4 | T5 | T12 | T13] |
| $X_0$ | [+1 | +1 | Ø | Ø] | [+1 | +1 | Ø | Ø] |
| $X_1$ | [+1 | −1 | Ø | Ø] | [+1 | −1 | Ø | Ø] |
| $X_2$ | [+1 | +1 | Ø | Ø] | [+1 | +1 | Ø | Ø] |
| $X_3$ | [+1 | −1 | Ø | Ø] | [+1 | −1 | Ø | Ø] |
| $X_4$ | [+1 | +1 | Ø | Ø] | [+1 | +1 | Ø | Ø] |
| $X_5$ | [−1 | −1 | Ø | Ø] | [−1 | −1 | Ø | Ø] |
| $X_6$ | [+1 | −1 | Ø | Ø] | [+1 | −1 | Ø | Ø] |
| $X_7$ | [−1 | +1 | Ø | Ø] | [−1 | +1 | Ø | Ø] |

As shown above in Table 1, the T4 and T5 timeslots of the subframe n and the subframe n+k carry a DM-RS sequence capable of supporting eight layers of spatial multiplexing. Notably, both the third and fourth symbols of the DM-RS sequence are not carried in (omitted or otherwise excluded from) the subframe n, while both the first and second symbols of the DM-RS sequence are excluded/omitted from the subframe n+k. In other words, neither the third nor the fourth symbols of the DM-RS sequence are carried in the subframe n, while neither the first nor the second symbols of the DM-RS sequence are carried in the subframe n+k.

Notably, the subframe n and subframe n+k may be consecutive frames (e.g., k=|1|) or non-consecutive frames (e.g., k>|1|), and may be transmitted in reverse order such that the subframe n is transported through the downlink channel after the subframe n+k (e.g., k<0). Because the position and sequencing of the subframe n and subframe n+k may vary, a means for allowing the receiver (e.g., the UE or the RN) to identify/locate the various subframe types (e.g., n_type and n+k_type frames) may be needed or desired. There are various ways to facilitate the location of subframe types by the receiver.

In one embodiment, the location of frame types may be accomplished through an implicit assignment such that some subframes are always n_type frames while other subframes are always n+k_type frames. A simple example of implicit assignment may be that every even subframe carries an n_type frame, while every odd subframe carries an n+k_type frame. Such an implementation is purely exemplary, as other patterns of implicit assignment may be used as well, e.g., patterns that allow less frequent communication of n_type and n+k_type frames, such as every-other third frame, etc.

In other embodiments, the location of frame types may be accomplished through higher layer signaling, e.g., radio resource control (RRC) signaling, Operation, Administration and Maintenance (OAM) signaling, etc. For instance, the eNB may send a message that indicates the location of an n_type frame and/or an n+k_type frame. In such embodiments, a bitmap or bitmap field may be used that includes a signaling bit for each subframe sent during a given period (e.g., 10 milliseconds (ms), . . . , 40 ms, etc.). The bitmap field may be similar to that included in Multicast-Broadcast Single Frequency Network (MBSFN) subframes. In some embodiments, the bitmap may include values for all subframes, including those frames that are not assigned to the Un link or the Uu link, in addition to Uu/Un link subframes. Alternatively, the bitmap may only include values for frames assigned to the Un/Uu link, which may advantageously achieve more compact signaling. One disadvantage of the bitmap only including values for frames assigned to the Un/Uu link is that more frequent bitmap transmissions may be required, as an updated bitmap may be sent every time the Un/Uu subframe allocation is modified.

In yet other embodiments, the location of frame types may be accomplished through Service Integration Bus (SIB) messaging. In such embodiments, all recipients (e.g., all RNs/UEs being served by the eNB) may identify subframe types according to a common pattern/scheme, e.g., as indicated by the SIB messaging. For instance, the position/sequence of n_type and n+k frames may be the same for a first UE as a second UE. Although the signaling may be simplified, such embodiments may lack the flexibility of other techniques for locating frame types.

In yet other embodiment, the location of frame types may be accomplished by predefining antenna ports. Such a configuration may be implemented using RRC or OAM signaling, and may be facilitated by the defining of new antenna ports in a relevant communications standard, such as 3GP TS 36.2111.

In embodiments where the subframe n and subframe n+k are not adjacent, it may be possible to specify (e.g., using a table) the locations of subframe n+k in relation to subframe n. Table 2 illustrates such a table, which is included for exemplary purposes as other positional mappings may be used in various embodiments. Notably, when k is a positive integer, the subframe n+k is transmitted after subframe n. When k is a negative integer, subframe n+k is transmitted prior to subframe n.

TABLE 2

| Subframe Configuration Index | eNB-RN UL-DL configuration | Subframe n location | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | | 10, or −10 | | | | | |
| 1 | | | | | | | | | | | 10 or −10 |
| 2 | | | | | | 5 or −5 | | | | | 5 or −5 |
| 3 | | | | | | 5 or −5 | | | | | 5 or −5 |
| 4 | | | | | | 5 or −5 | | | | | 5 or −5 |
| 5 | 2 | | | | | | | | | 10 or −10 | |
| 6 | | | | | 10 or −10 | | | | | | |
| 7 | | | | | | 4 or −6 | | | | −4 or 6 | |

TABLE 2-continued

| Subframe Configuration Index | eNB-RN UL-DL configuration | \multicolumn{10}{c}{Subframe n location} | | | | | | | | | |
|---|---|---|---|---|---|---|---|---|---|---|---|
| | | 0 | 1 | 2 | 3 | 4 | 5 | 6 | 7 | 8 | 9 |
| 8 | | | | | −4 or 6 | | | | | | 4 or −6 |
| 9 | | | | | 1 or 4 | −1 or 5 | | | | −4 or 5 | |
| 10 | | | | | −4 or 5 | | | | | 1 or −5 | −1 or 4 |
| 11 | 3 | | | | | | | | 2 or −8 | | −2 or 8 |
| 12 | | | | | | | | | 1 or −8 | −1 or 1 | −1 or 8 |
| 13 | 4 | | | | | | | | | | 10 or −10 |
| 14 | | | | | | | | | 2 or −8 | | −2 or 8 |
| 15 | | | | | | | | | | 1 or −9 | −1 or 9 |
| 16 | | | | | | | | | 1 or −8 | 1 or −1 | −1 (or 8) |
| 17 | | | | | | 3 or −5 | | | 1 or −3 | 1 or −1 | −1 or 8 |
| 18 | 6 | | | | | | | | | | 10 or −10 |

As an alternative to mapping the specific location of the two subframes, a table with generic patterns may be used for building a variety of possible Un subframe configurations. This may be done by indicating the corresponding subframe n+k for each subframe n using an index. In embodiments, the UL/DL configuration may be a combination of one or several generic sub-patterns that is uniquely identified by a list of indices. An exemplary table of the indices is depicted in tables 3 and 4. For instance, 'Subframe Configuration Index #4' (in Table 2) may be configured with index 5 and/or index 17 from Table 3. For instance (according to Table 4), when index 8 is used, the $5^{th}$ subframe (e.g., $S_4$) in a set may correspond to a subframe n type, and the $8^{th}$ subframe (e.g., $S_{4+3}=S_7$) in the set may correspond to a subframe n+k type.

TABLE 3

| Index | Subframe n | Subframe n + k |
|---|---|---|
| 0 | 9 | 3 [next frame] |
| 1 | 8 | 3 [next frame] |
| 2 | 3 | 7 |
| 3 | 3 | 3 [next frame] |
| 4 | 3 | 4 |
| 5 | 9 | 4 [next frame] |
| 6 | 4 | 8 |
| 7 | 4 | 4 [next frame] |
| 8 | 4 | 7 |
| 9 | 7 | 9 |
| 10 | 7 | 8 |
| 11 | 8 | 9 |
| 12 | 8 | 8 [next frame] |
| 13 | 9 | 9 [next frame] |

TABLE 4

| Index | \multicolumn{10}{c}{Subframe n} | | | | | | | | | |
|---|---|---|---|---|---|---|---|---|---|---|
| | 0 | 1 | 2 | 3 | 4 | 5 | 6 | 7 | 8 | 9 |
| 0 | | | | | | | | | | 4 |
| 1 | | | | | | | | | 5 | |
| 2 | | | | | | | 6 | | | |
| 3 | | | | 10 | | | | | | |
| 4 | | | | | 1 | | | | | |
| 5 | | | | | | | | | | 5 |
| 6 | | | | | | | 6 | | | |
| 7 | | | | 10 | | | | | | |
| 8 | | | | | 3 | | | | | |
| 9 | | | | | | | | | | 8 |
| 10 | | | | | | | | | 9 | |
| 11 | | | | | | | 1 | | | |
| 12 | | | | | 4 | | | | | |
| 13 | | | | | | | | | | 9 |
| 14 | | | | | | 10 | | | | |

TABLE 4-continued

| Index | \multicolumn{10}{c}{Subframe n} | | | | | | | | | |
|---|---|---|---|---|---|---|---|---|---|---|
| | 0 | 1 | 2 | 3 | 4 | 5 | 6 | 7 | 8 | 9 |
| 15 | | | | | | | | 1 | | |
| 16 | | | | | | | | | 2 | |
| 17 | | | | | 5 | | | | | |
| 18 | | | | | | | | | | 10 |

Figure 5:
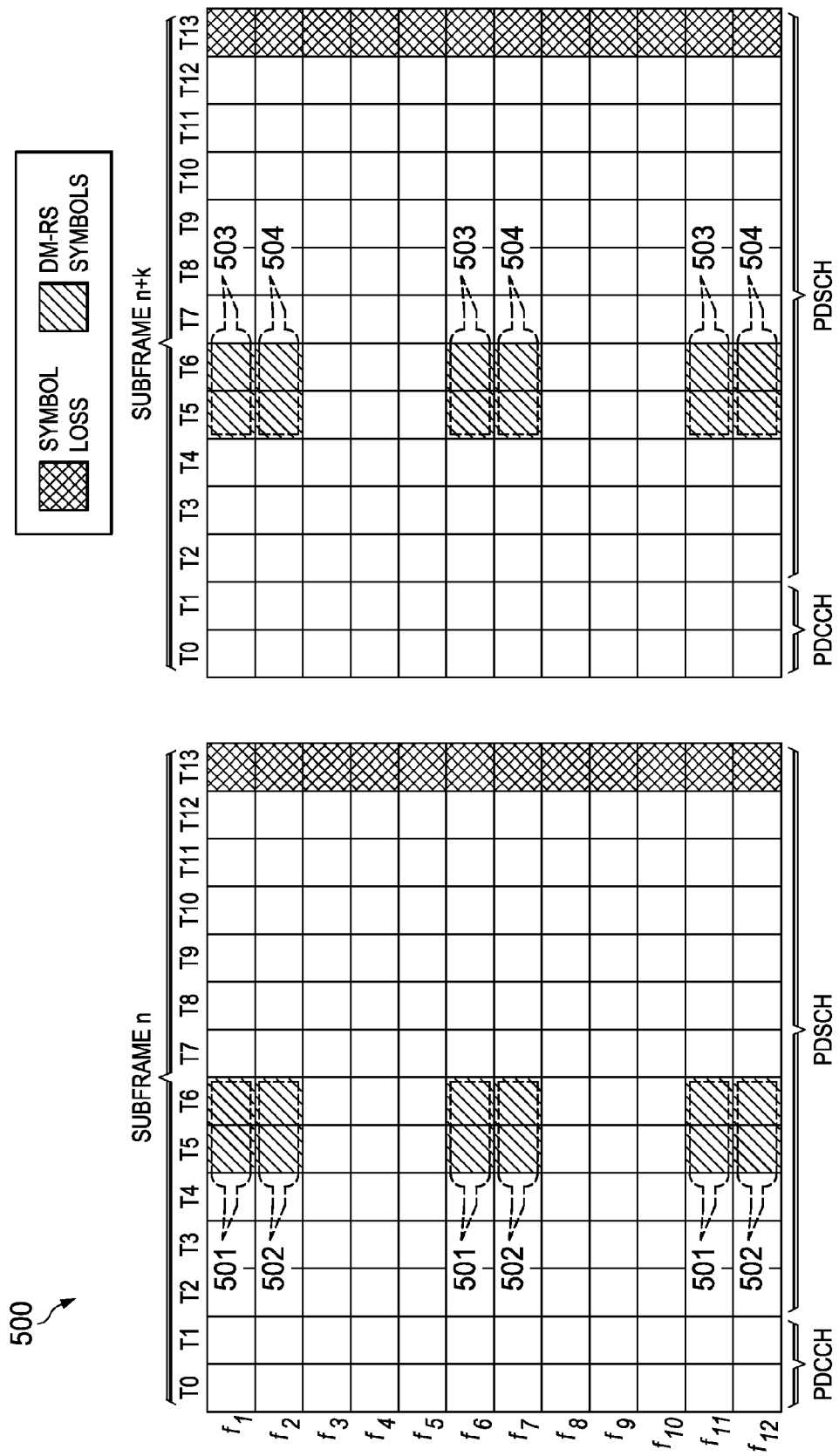
FIG. 5 illustrates a diagram of an embodiment of a transmission sequence for carrying DMRS symbols in four length-2 OCCs.

An alternative solution for supporting eight layers of spatial multiplexing during non-ideal channel conditions is to carry four length-2 OCCs using two subframes. FIG. 5 illustrates a transmission sequence 500 for carrying four length-2 OCCs 501-504 in a pair of subframes. As shown, the length-2 OCCs 501-502 are carried in the subframe n, while the length-2 OCCs 503-504 are carried in the subframe n+k. Additional instances of the length-2 OCCs 501-504 are carried in the $f_6$-$f_7$ and $f_{11}$-$f_{12}$ subcarriers of the subframe n and the subframe n+k. The length-2 OCCs 501-502 may support a first set of antenna ports (e.g., 7, 8, 9, 10), while the length-2 OCCs 503-504 may support a second set of antenna ports (e.g., 11, 12, 13, 14). Accordingly, the transmission sequence 500 supports up to eight layers of spatial multiplexing even when the T13 timeslots of one (or both) of the subframe n and the subframe n+k are unavailable for carrying DM-RS symbols.

Figure 6:
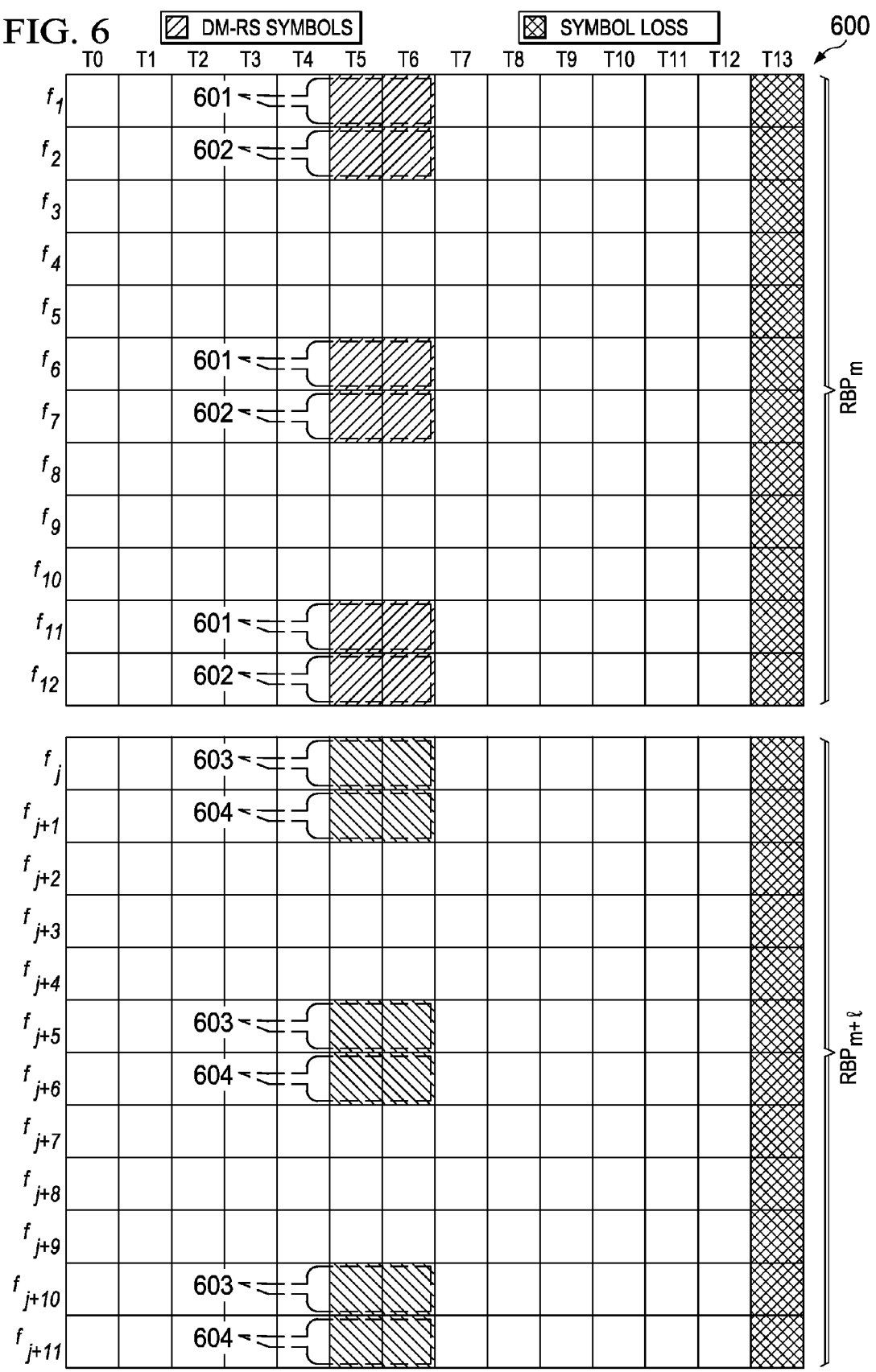
FIG. 6 illustrates a diagram of another embodiment of a transmission sequence for carrying DMRS symbols in four length-2 OCCs.

Yet another alternative solution for supporting eight layers of spatial multiplexing during non-ideal channel conditions is to carry four length-2 OCCs in different RBs (i.e., different frequency bands) of the same subframe (e.g., using more frequency resources to carry DM-RS symbols). Such a solution may be attractive when the channel coherence bandwidth is relatively large. FIG. 6 illustrates a transmission sequence 600 for carrying two length-2 OCCs 601-602 in a first RB pair ($RBP_m$) of the subframe n and an additional two length-2 OCCs 603-604 in a second RBP ($RBP_{m+l}$) of the subframe n. Notably, the $RBP_m$ includes subcarriers $f_1$-$f_{12}$ of the subframe n, while the $RBP_{m+l}$ includes subcarriers $f_j$-$f_{(j+11)}$. Additional instances of length-2 OCCs 601-602 are carried in the $f_6$-$f_7$ and $f_{11}$-$f_{12}$ subcarriers of the $RBP_m$, while additional instances of length-2 OCCs 603-604 are carried in the $f_{(j+5)}$-$f_{(j+6)}$ and $f_{(j+5)}$-$f_{(j+11)}$ subcarriers of the $RBP_{m+l}$. In some embodiments, the length-2 OCCs 601-602 may support a first set of antenna ports (e.g., 7, 8, 9, and 10), while the length-2 OCCs 603-604 may support a second set of antenna ports (e.g., 11, 12, 13, 14). Accordingly, the transmission sequence 600 supports up to eight layers of spatial multiplexing even when the T13 timeslots of the subframe n is unavailable for carrying DM-RS symbols.

Figure 7:
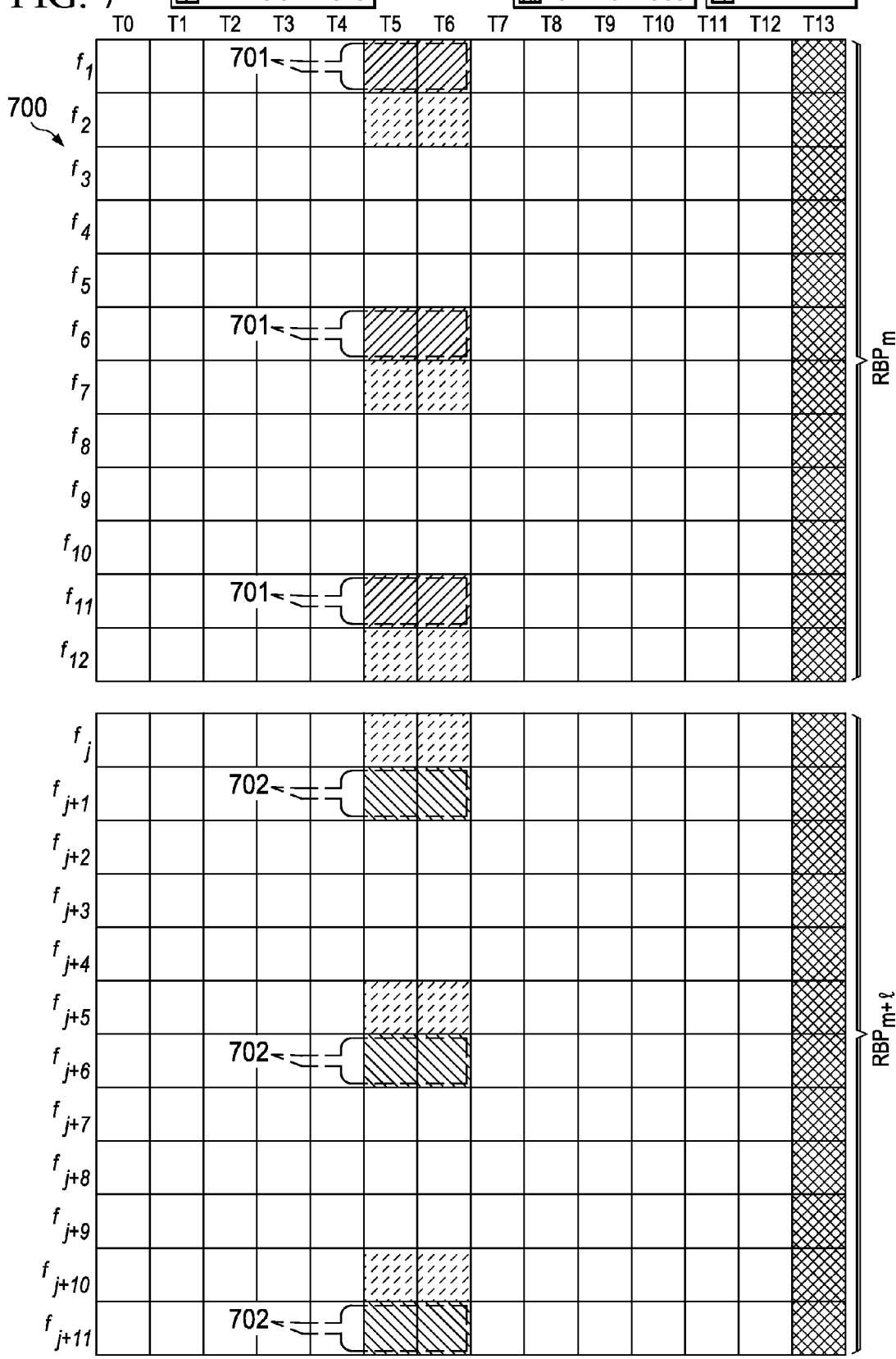
FIG. 7 illustrates a diagram of an embodiment of a transmission sequence for carrying DMRS symbols in two length-2 OCCs.

When only four layers of spatial multiplexing are desired, a pair of length-2 OCCs may be carried in different RBPs of the same subframe. FIG. 7 illustrates a transmission sequence 700 for carrying a length-2 OCC 701 in a RBP$_m$ of the subframe n and a length-2 OCC 702 in a RBP$_{m+1}$ of the subframe n. Additional instances of the length-2 OCC 701 are carried in the f$_6$-f$_7$ and f$_{11}$-f$_{12}$ subcarriers of the RBP$_m$, while additional instances of length-2 OCC 702 are carried in the f$_{(j+4)}$-f$_{(j+5)}$ and f$_{(j+10)}$-f$_{(j+11)}$ subcarriers of the RBP$_{m+1}$. Each of the length-2 OCCs 701-702 may support two antenna ports, thereby allowing the transmission sequence 700 to support up to four layers of spatial multiplexing (irrespective of symbol loss in the T13 timeslot).

Figure 8:
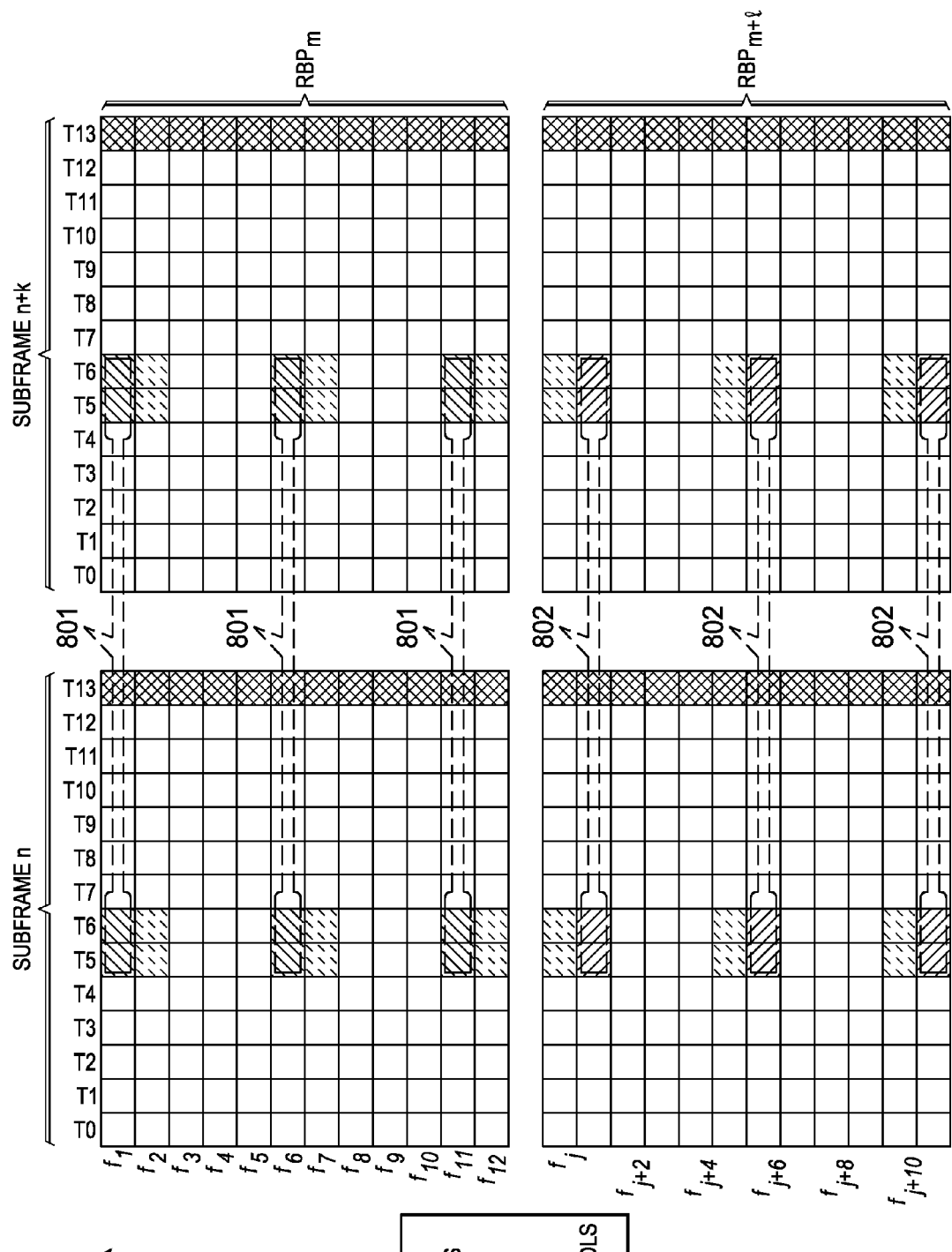
FIG. 8 illustrates a diagram of another embodiment of a transmission sequence for carrying DMRS symbols in two length-4 OCCs.

Yet another solution for supporting eight layers of spatial multiplexing during non-ideal channel conditions is to carry two length-4 OCCs in non-adjacent RBPs of two subframes. FIG. 8 illustrates a transmission sequence 800 for carrying a first length-4 OCC 801 a first RBP of the subframe n and the subframe n+k, and a second length-4 OCC 802 in the RBP$_{m+1}$ of the subframe n and the subframe n+k. Specifically, the first and second symbols of the length-4 OCC 801 are carried by the RBP$_m$ of the subframe n, while the second and third symbols of the length-4 OCC 801 are carried by the RBP$_m$ of the subframe n+k. Likewise, the first and second symbols of the length-4 OCC 802 are carried by the RBP$_{m+1}$ of the subframe n, while the third and fourth symbols of the length-4 OCC 802 are carried by the RBP$_{m+1}$ of the subframe n+k. In embodiments, the length-4 OCC 801 may support a first set of antenna ports (e.g., 7, 8, 9, and 10), while the length-4 OCC 802 may support a second set of antenna ports (e.g., 11, 12, 13, and 14). Hence, the sequence 800 may support up to eight layers of spatial multiplexing even when the T13 timeslots of one (or both) of the subframe n and the subframe n+k are unavailable for carrying DM-RS symbols.

Figure 9:
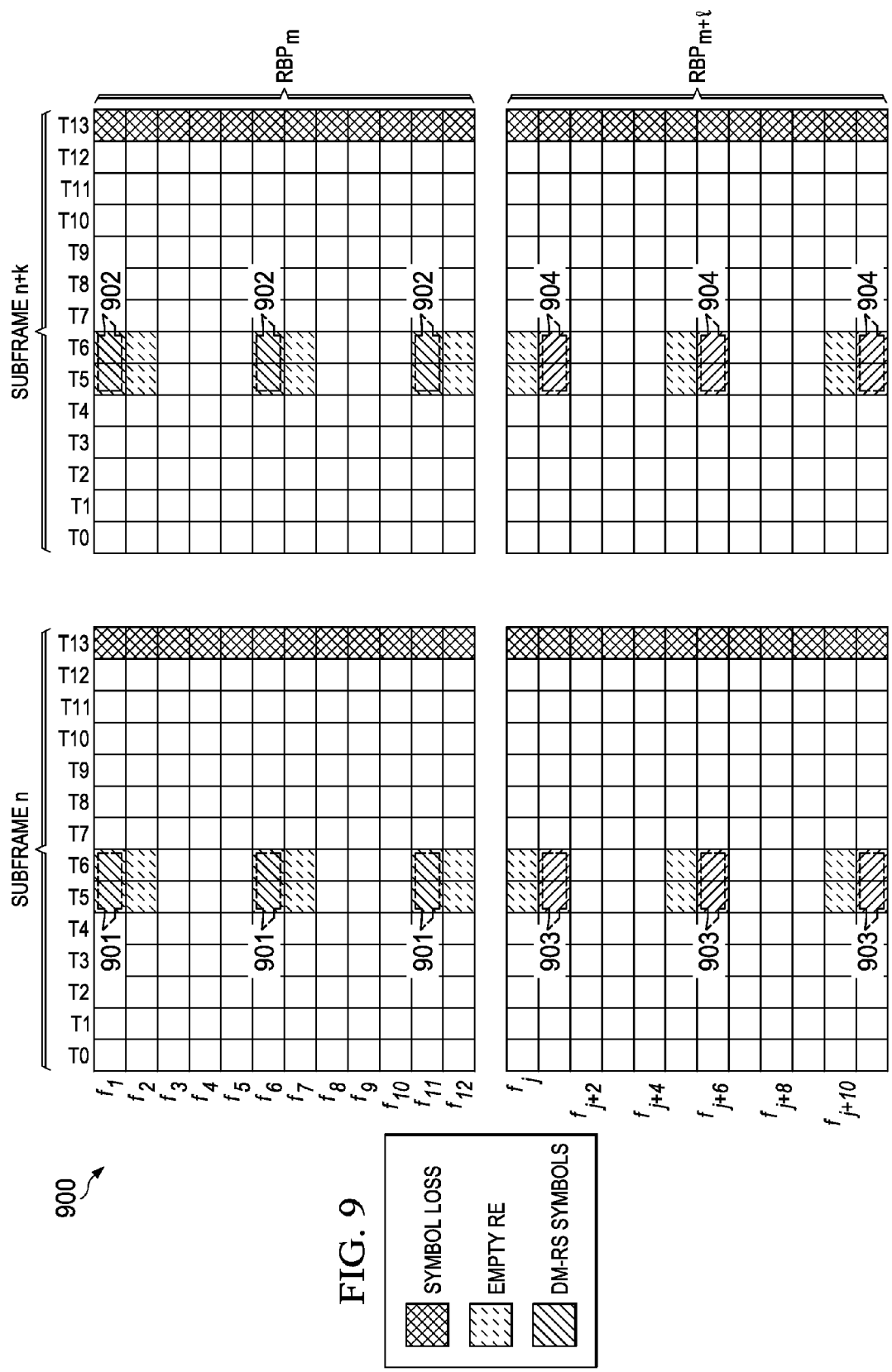
FIG. 9 illustrates a diagram of another embodiment of a transmission sequence for carrying DMRS symbols in four length-2 OCCs.

Yet another solution for supporting eight layers of spatial multiplexing during non-ideal channel conditions is to carry four length-2 OCCs in non-adjacent RBPs of two subframes FIG. 9 illustrates a transmission sequence 900 for carrying four length-2 OCCs 901-904. As shown, the length-2 OCC 901 is carried by the RBP$_m$ of the subframe n, the length-2 OCC 902 is carried by the RBP$_{m+1}$ of the subframe n, the length-2 OCC 903 is carried by the RBP$_m$ of the subframe n+k, and the length-2 OCC 904 is carried by the RBP$_{m+1}$ of the subframe n+k. In embodiments, the length-2 OCC 901 may support a pair of antenna ports (e.g., 7 and 8), the length-2 OCC 902 may support a pair of antenna ports (e.g., 9 and 10), the length-2 OCC 903 may support a pair of antenna ports (e.g., 11 and 12), and the length-2 OCC 904 may support a pair of antenna ports (e.g., 13 and 14). Hence, the sequence 900 may support up to eight layers of spatial multiplexing even when the T13 timeslots of one (or both) of the subframe n and the subframe n+k are unavailable for carrying DM-RS symbols.

Figure 10:
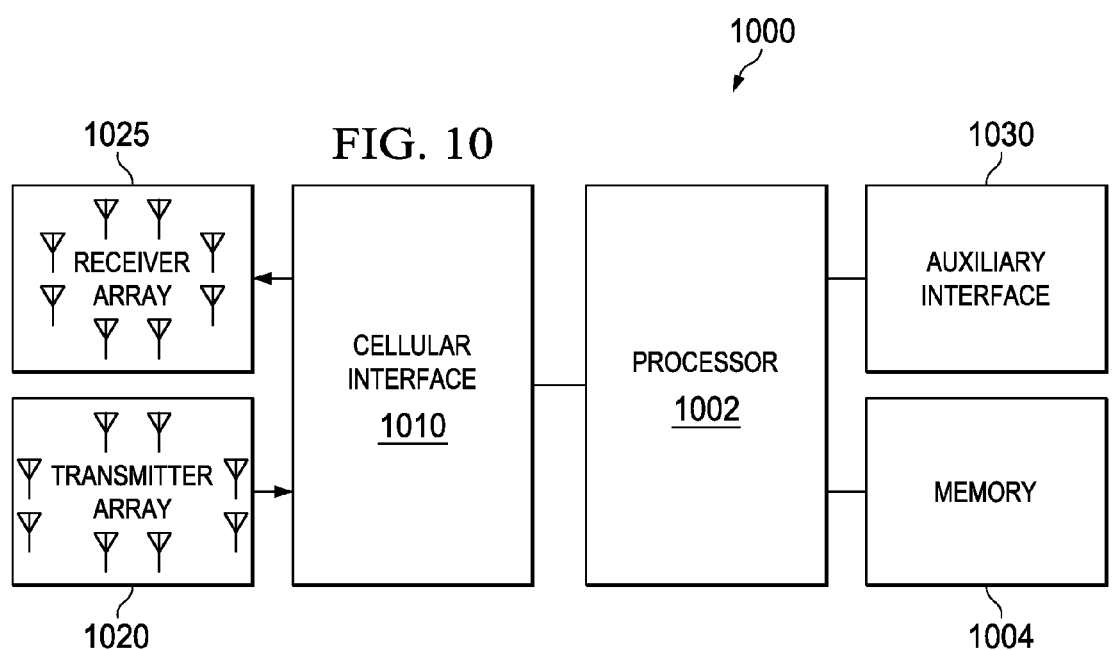
FIG. 10 illustrates a block diagram of an embodiment of a communications device.

FIG. 10 illustrates a block diagram of an embodiment of a base station 1000. The base station 1000 may include a processor 1002, a memory 1004, a cellular interface 1010, a transmitter array 1020, a receiver array 1025, and an auxiliary interface 1030, which may (or may not) be arranged as shown in FIG. 10. The processor 1002 may be any component capable of performing computations and/or other processing related tasks, and the memory 1004 may be any component capable of storing programming and/or instructions for the processor 1002. The cellular interface 1010 may be any component or collection of components that allows the base station 1000 to communicate using a cellular signal, and may be used to receive and/or transmit information over a cellular connection of a cellular network. The transmitter array 1020 may be any device that facilitates a wireless transmission by the base station 1000 via the cellular interface 1010. In an embodiment, the transmitter array 1020 may comprise a plurality of antennas (or antenna ports) that enable the base station 1000 to implement MIMO techniques. In such embodiments, the transmitter array 1020 may have as many as eight (or more) antennas/antenna-ports for engaging in multi-layer (e.g., eight or more layers) of spatial multiplexing. The receiver array 1025 may be any device that facilitates reception of a wireless signal by the base station 1000 via the cellular interface 1010. In an embodiment, the receiver array 1025 may comprise a plurality of antennas (or antenna ports) that enable the base station 1000 to implement MIMO techniques, including, for example, multiuser and/or single user uplink MIMO communication. The auxiliary interface 1030 may be any component or collection of components that allows the base station 1000 to communicate with other devices (e.g., backhaul networks, other base stations), and may be used to implement either a wire-line or wireless connection with the devices.

Notably, aspects of this disclosure may be applicable to transmissions involving a reduced DM-RS sequence (e.g., as may potentially be set-forth in future LTE releases) as well as transmissions involving an extended cyclic prefix subframe (e.g., where four DM-RS sequences are transmitted). These are mentioned herein for exemplary purposes only, and represent only two of the numerous possible implementations to which aspects of this disclosure may apply.

Although the present invention and its advantages have been described in detail, it should be understood that various changes, substitutions and alterations can be made herein without departing from the spirit and scope of the invention as defined by the appended claims. Accordingly, the appended claims are intended to include within their scope such processes, machines, manufacture, compositions of matter, means, methods, or steps.

What is claimed is:

1. A method of communicating reference signal symbols, the method comprising:
communicating, by a wirelessly enabled device, a first subframe in a channel, the first subframe carrying a first set of symbols of a first spreading code sequence and a first set of symbols of a second spreading code sequence; and
communicating a second subframe in a channel, the second subframe carrying a second set of symbols of the first spreading code and a second set of symbols of the second spreading code sequence, wherein the first set of symbols of the first spreading code sequence are excluded from the second subframe and the second set of symbols of the first spreading code sequence are excluded from the first subframe.

2. The method of claim 1, wherein channel state information of the channel is obtained by performing channel estimation on all symbols of the first spreading code sequence and all symbols of the second spreading code sequence.

3. The method of claim 2, wherein the second set of symbols of the second spreading code sequence are excluded from the first subframe, and
wherein the first set of symbols of the second spreading code sequence are excluded from the second subframe.

4. The method of claim 1, wherein the first set of symbols of the first spreading code sequence and the second set of symbols of the first spreading code sequence are configured to provide channel estimation for the same spatial multiplexing stream in the same channel.

5. An apparatus for communicating reference signal symbols, the apparatus comprising:
a processor; and
a non-transitory computer readable storage medium storing programming for execution by the processor, the programming including instructions to:
communicate a first subframe in a channel, the first subframe carrying a first set of symbols of a first spreading code sequence and a first set of symbols of a second spreading code sequence; and
communicate a second subframe in a channel, the second subframe carrying a second set of symbols of the first spreading code and a second set of symbols of the second spreading code sequence, wherein the first set of symbols of the first spreading code sequence are excluded from the second subframe and the second set of symbols of the first spreading code sequence are excluded from the first subframe.

6. The apparatus of claim 5, wherein channel state information of the channel is obtained by performing channel estimation on all symbols of the first spreading code sequence and all symbols of the second spreading code sequence.

7. The apparatus of claim 6, wherein the second set of symbols of the second spreading code sequence are excluded from the first subframe, and
wherein the first set of symbols of the second spreading code sequence are excluded from the second subframe.

8. The apparatus of claim 5, wherein the first set of symbols of the first spreading code sequence and the second set of symbols of the first spreading code sequence are configured to provide channel estimation for the same spatial multiplexing stream in the same channel.

9. A method of communicating reference signal symbols, the method comprising:
communicating, by a wirelessly enabled device, a first subframe in a downlink channel, the first subframe carrying a first symbol and a second symbol of a first length-4 orthogonal cover code (OCC) sequence and a first symbol and a second symbol of a second length-4 OCC sequence; and
communicating a second subframe in the downlink channel, the second subframe carrying a third symbol and a fourth symbol of the first length-4 OCC and a third symbol and a fourth symbol of the second length-4 OCC sequence, wherein the third symbol and the fourth symbol of the first length-4 OCC sequence are excluded from the first subframe, and wherein the first symbol and the second symbol of the first length-4 OCC sequence are excluded from the second subframe.

10. The method of claim 9, wherein all four symbols of the first length-4 OCC sequence and all four symbols of the second length-4 OCC sequence are configured to provide channel estimation for spatial multiplexing streams in a single channel.

11. The method of claim 10, wherein all four symbols of the first length-4 OCC sequence and all four symbols of the second length-4 OCC sequence are configured to support spatial multiplexing that utilizes five or more antenna ports.

12. The method of claim 9, wherein communicating the first subframe includes failing to successfully transmit the last symbol of the first subframe, the failure to successfully transmit the last symbol of the first subframe being attributable to a symbol-loss of the first subframe.

13. The method of claim 12, wherein the first subframe and the second subframe each comprise fourteen time-slots.

14. The method of claim 12, wherein the first subframe and the second subframe each comprise twelve time-slots.

15. The method of claim 9, wherein channel estimation on the first length-4 OCC sequence supports a first set of four antenna ports, and wherein channel estimation on the second length-4 OCC sequence supports a second set of four antenna ports, the second set of four antenna ports including different antenna ports than the first set of four antenna ports.

16. The method of claim 9, wherein all four symbols of the first length-4 OCC sequence are configured to provide channel estimation for the same spatial multiplexing stream in the same channel.

17. A method of communicating reference signal symbols, the method comprising:
communicating, by a wirelessly enabled device, a first subframe in a downlink channel, the first subframe comprising a first resource block pair (RBP) carrying a first symbol and a second symbol of a first length-4 orthogonal cover code (OCC) sequence and a second RBP carrying a first symbol and a second symbol of a second length-4 OCC sequence, the second RBP and the first RBP spanning different frequency bands of the downlink channel,
wherein the first length-4 OCC sequence and the second length-4 OCC sequence are configured to provide channel estimation for spatial multiplexing streams in the same channel.

18. The method of claim 17, further comprising:
communicating, by the wirelessly enabled device, a second subframe in the downlink channel, the second subframe comprising a third RBP carrying a third symbol and a fourth symbol of the first length-4 OCC sequence and a fourth RBP carrying a third symbol and a fourth symbol of the second length-4 OCC sequence, wherein the third RBP and the first RBP span identical frequency bands of the downlink channel, and wherein the fourth RBP and the second RBP span identical frequency bands of the downlink channel.

19. An apparatus for communicating reference signal symbols, the apparatus comprising:
a processor; and
a non-transitory computer readable storage medium storing programming for execution by the processor, the programming including instructions to:
communicate a first subframe in a downlink channel, the first subframe carrying a first symbol and a second symbol of a first length-4 orthogonal cover code (OCC) sequence; and
communicate a second subframe in the downlink channel, the second subframe carrying a third symbol and a fourth symbol of the first length-4 OCC, wherein the first symbol and the second symbol of the first length-4 OCC sequence are excluded from the second subframe, and
wherein the third symbol and the fourth symbol of the first length-4 OCC sequence are excluded from the first subframe.

20. The apparatus of claim 19, wherein communicating all four symbols of the first length-4 OCC sequence supports spatial multiplexing that utilizes five or more antenna ports.

21. The apparatus of claim 19, wherein the first subframe and the second subframe comprise fourteen timeslots each, and wherein communicating the first subframe includes failing to successfully transmit the last timeslot of the first subframe, the failure to successfully transmit the last symbol of the first subframe being attributable to a symbol-loss of the first subframe.

22. The apparatus of claim 19, wherein the first subframe further comprises a first symbol and a second symbol of a second length-4 orthogonal cover code (OCC) sequence, wherein the second subframe further comprises a third symbol and a fourth symbol of the second length-4 OCC.

23. The apparatus of claim 19, wherein all four symbols of the first length-4 OCC sequence are configured to provide channel estimation for the same spatial multiplexing stream in the same channel.

24. A method of communicating reference signal symbols, the method comprising:
   communicating a first subframe in a downlink channel, the first subframe carrying a first length-2 orthogonal cover code (OCC) sequence and a second length-2 OCC sequence; and
   communicating a second subframe in the downlink channel, the second subframe carrying a third length-2 OCC sequence and fourth length-2 OCC sequence,
   wherein the first subframe comprises a first resource block pair (RBP) carrying the first length-2 OCC sequence and a second RBP carrying the second length-2 OCC sequence,
   wherein the second RBP and the first RBP span different frequency bands of the downlink channel, and
   wherein the first length-2 OCC sequence and the second length-2 OCC sequence are configured to provide channel estimation for spatial multiplexing streams in the same channel.

25. The method of claim 24, wherein the first subframe comprises:
   a first resource block pair (RBP) carrying the first length-2 OCC sequence; and
   a second RBP carrying the second length-2 OCC sequence, the second RBP and the first RBP spanning different frequency bands of the downlink channel.

26. An apparatus for communicating reference signal symbols, the apparatus comprising:
   a processor; and
   a non-transitory computer readable storage medium storing programming for execution by the processor, the programming including instructions to:
      communicate a first subframe in a downlink channel, the first subframe carrying a first length-2 orthogonal cover code (OCC) sequence and a second length-2 OCC sequence; and
      communicate a second subframe in the downlink channel, the second subframe carrying a third length-2 OCC sequence and fourth length-2 OCC sequence, wherein the first subframe comprises a first resource block pair (RBP) carrying the first length-2 OCC sequence and a second RBP carrying the second length-2 OCC sequence, wherein the second RBP and the first RBP span different frequency bands of the downlink channel, and wherein the first length-2 OCC sequence and the second length-2 OCC sequence are configured to provide channel estimation for spatial multiplexing streams in the same channel.

27. A method of communicating reference signal symbols, the method comprising:
   communicating, by a wirelessly enabled device, a first subframe in a downlink channel, the first subframe comprising:
   a first resource block pair (RBP) carrying a first length-2 orthogonal cover code (OCC) sequence and a second length-2 OCC sequence, wherein both the first length-2 OCC sequence and the second length-2 OCC sequence correspond to a first set of four antenna ports; and
   a second RBP carrying a third length-2 OCC sequence and a fourth length-2 OCC sequence, wherein both the third length-2 OCC sequence and the fourth length-2 OCC sequence correspond to a second set of four antenna ports that is different from the first set of antenna ports,
   wherein the first length-2 OCC sequence, the second length-2 OCC sequence, the third length-2 OCC sequence, and the fourth length-2 OCC sequence are configured to provide channel estimation for spatial multiplexing streams in the same channel, and
   wherein the first RBP and the second RBP span different frequency bands of the downlink channel.

* * * * *